(No Model.)

W. INGALLS.
MACHINE FOR SOWING AND HARROWING SEED.

No. 328,488. Patented Oct. 20, 1885.

Witnesses:
S. N. Piper
Ernest B. Pratt

Inventor,
Wellington Ingalls
by R. H. Eddy atty.

UNITED STATES PATENT OFFICE.

WELLINGTON INGALLS, OF MATTAWAMKEAG, MAINE, ASSIGNOR, BY MESNE ASSIGNMENTS, TO HIMSELF AND AUGUSTUS O. BAILEY, OF SAME PLACE.

MACHINE FOR SOWING AND HARROWING SEED.

SPECIFICATION forming part of Letters Patent No. 328,488, dated October 20, 1885.

Application filed December 1, 1884. Serial No. 149,253. (No model.)

*To all whom it may concern:*

Be it known that I, WELLINGTON INGALLS, of Mattawamkeag, in the county of Penobscot, of the State of Maine, have invented a new and useful Improvement in Machines for Sowing and Harrowing Seed; and I do hereby declare the same to be described in the following specification and represented in the accompanying drawings, of which—

Figure 1:
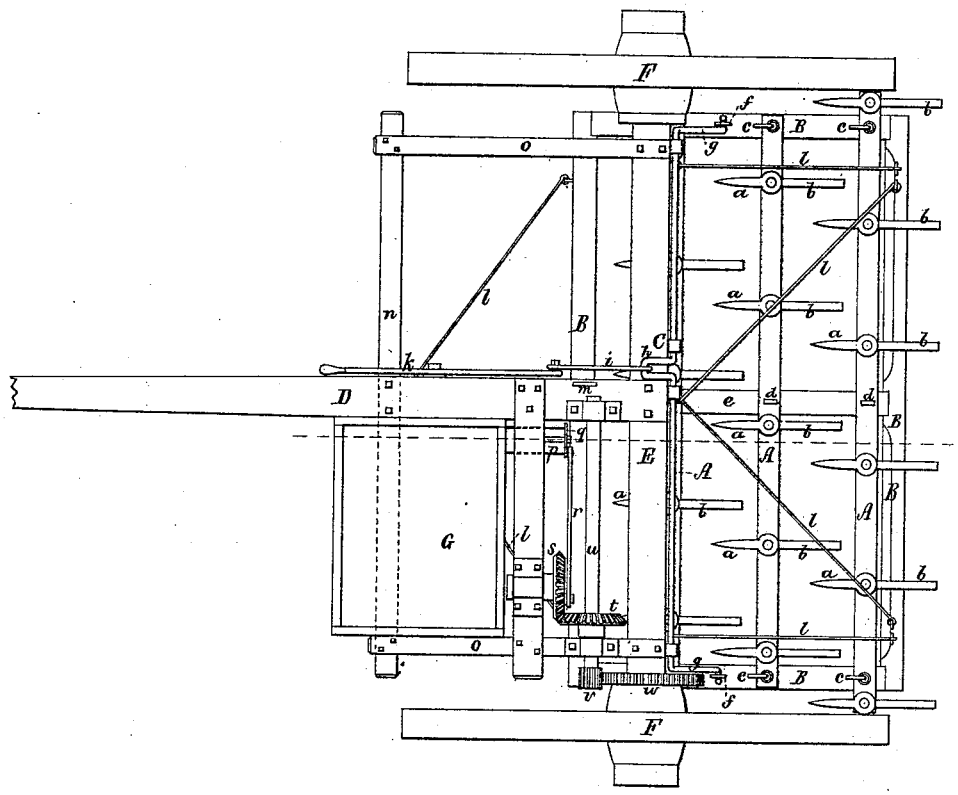
Figure 2:
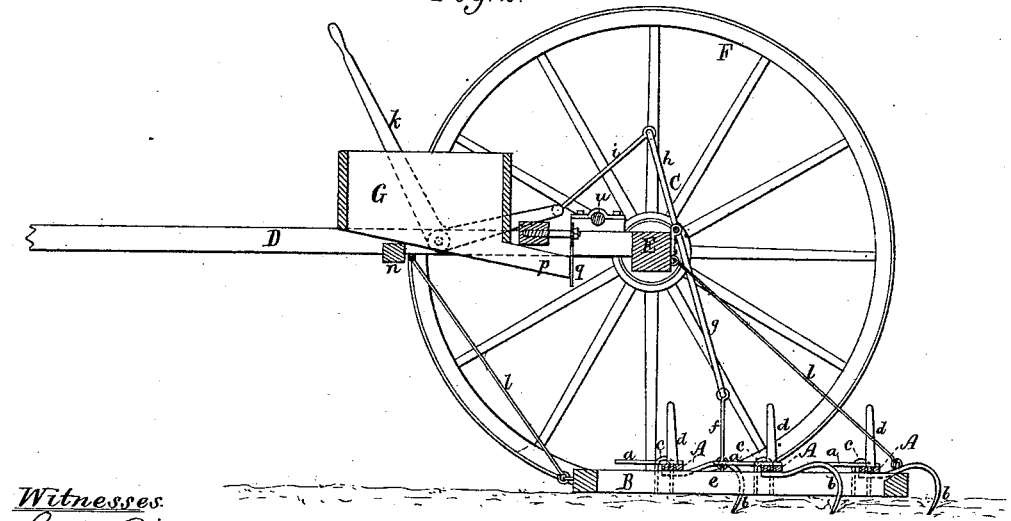

Figure 1 is a top view, and Fig. 2 a longitudinal section, of a combined seed sower and harrower provided with my invention, the nature of which is defined in the claims hereinafter presented.

The harrow of the machine has in it a series of rocker-bars, each of which has projecting in opposite directions from it two series of teeth, one of such series being straight and inelastic and the other curved and elastic, like springs. These rocker-bars are shown at A A A, the straight and inelastic teeth of each being represented at $a\ a\ a$, &c., and their curved and elastic teeth at $b\ b\ b$, &c. Each of such bars is held to a rectangular frame, B, by means of staples $c\ c$, each of which has one of its legs going loosely through a hole in the bar, while the other leg does not go through the bar. Both legs, however, go into the frame. This mode of connecting each bar to the frame admits of the bar being turned, so as to tip its straight teeth from a horizontal down into a vertical position, there being to each bar at its middle a prong, $d$, which, when the straight teeth are vertical, bears on a girt, $e$, extending across the frame B at its middle. Such girt and prong serve to support the straight teeth in their vertical positions while they may be in and dragged through the ground. When the bars are turned backward, so as to rest flatwise on the frame, the curved teeth will extend below the frame and may be used for harrowing.

The frame B is supported by links $ff$ to the outer arms, $g\ g$, of a furcated lever, C, whose inner arm, $h$, is connected by a link, $i$, with a bent lever, $k$, fulcrumed to a draft-tongue, D, extending from the middle of the axle E, provided with two wheels, F F.

By means of the lever C the frame B may be elevated so as to raise the harrow-teeth out of contact with the ground. When the frame B is sufficiently depressed for the teeth to work in the earth, it is held in position by stays $l$, extending from it to the axle, and jointed thereto and to the frame. On the middle arm of the lever C being turned down upon the tongue, such arm may be held in position by a turn-button or hook, $m$.

There is attached to the tongue a bar, $n$, to which is connected with the axle by two bars, $o\ o$, arranged as shown.

Fixed to the bar $n$ and the tongue is a hopper, G, having an inclined bottom leading to a spout or discharging-nose, $p$. A rocker-lever, $q$, is arranged to swing or play across the outer end of the spout. When this lever is rapidly vibrated, it will strike the seed when emerging from the spout and disseminate them over the surface of the ground. A connecting-rod, $r$, extends from the upper arm of the lever or seed-spreader $q$ to a crank-wheel, $s$, which is a bevel-gear, and engages with another such gear, $t$, fixed on a shaft, $u$, on which is a pinion, $v$, to engage with a spur-gear, $w$, fixed on the hub of one of the wheels.

As the machine is drawn over the ground by animals yoked to the tongue, seed will be discharged from the hopper and spread over the ground, and by the harrow the ground will be opened and the seed covered.

I claim—

1. The combination, in a seeding-harrow, of the frame B, the set of rocker-bars A, and the sets of inelastic straight teeth and elastic curved teeth extending from each of said bars, substantially as described.

2. The combination of the harrow, provided with the sets of inelastic straight teeth and curved elastic ones, adjustable in the harrow-frame, and with mechanism for elevating and depressing it, as described, with the axle and wheels, and the hopper and seed-spreader, and mechanism for operating the latter, as specified, by means of one of the wheels, all being essentially as set forth.

WELLINGTON INGALLS.

Witnesses:
GEO. W. BLAKEMORE,
J. H. JORDAN.